US009317356B2

(12) United States Patent
Cardona et al.

(10) Patent No.: US 9,317,356 B2
(45) Date of Patent: Apr. 19, 2016

(54) DEVICE STATE CAPTURE DURING OPERATING SYSTEM DUMP

(71) Applicant: GLOBALFOUNDRIES INC., Grand Cayman (KY)

(72) Inventors: Omar Cardona, Cedar Park, TX (US); Baltazar De Leon, III, Austin, TX (US); Marcus B. Grande, Pflugerville, TX (US); Brian W. Hart, Austin, TX (US); Vikramjit Sethi, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 401 days.

(21) Appl. No.: 14/054,182

(22) Filed: Oct. 15, 2013

(65) Prior Publication Data

US 2015/0106661 A1 Apr. 16, 2015

(51) Int. Cl.
*G06F 11/07* (2006.01)

(52) U.S. Cl.
CPC ........ *G06F 11/0778* (2013.01); *G06F 11/0721* (2013.01)

(58) Field of Classification Search
CPC ............ G06F 11/0778; G06F 11/0721; G06F 11/3476; H04L 41/0681; H04L 63/1416
See application file for complete search history.

(56) References Cited

U.S. PATENT DOCUMENTS

| 6,182,243 | B1 * | 1/2001 | Berthe | ................ | G06F 11/3476 |
| | | | | | 714/38.11 |
| 6,615,364 | B1 * | 9/2003 | Masuda | ................ | G06F 11/073 |
| | | | | | 714/24 |
| 6,681,348 | B1 * | 1/2004 | Vachon | ................ | G06F 11/0778 |
| | | | | | 714/38.11 |
| 7,574,627 | B2 * | 8/2009 | Ogasawara | ......... | G06F 11/0712 |
| | | | | | 714/38.11 |
| 7,725,937 | B1 * | 5/2010 | Levy | ...................... | G06F 21/554 |
| | | | | | 713/187 |
| 8,762,790 | B2 * | 6/2014 | McCoy | ................. | G06F 11/079 |
| | | | | | 714/38.1 |
| 9,176,805 | B2 * | 11/2015 | Geisert | ............... | G06F 11/0778 |
| 2002/0166083 | A1 * | 11/2002 | Anderson | ........... | G06F 11/0778 |
| | | | | | 714/37 |
| 2005/0268187 | A1 * | 12/2005 | Meaney | .............. | G06F 11/0772 |
| | | | | | 714/723 |
| 2006/0136923 | A1 | 6/2006 | Kahn et al. | | |
| 2006/0168471 | A1 * | 7/2006 | Schulstad | ........... | G06F 11/0727 |
| | | | | | 714/6.11 |
| 2006/0259708 | A1 * | 11/2006 | Hsu | ...................... | G06F 11/1441 |
| | | | | | 711/147 |
| 2007/0234293 | A1 * | 10/2007 | Noller | ................. | G06F 11/3688 |
| | | | | | 717/124 |
| 2008/0294839 | A1 * | 11/2008 | Bell | ....................... | G06F 9/5016 |
| | | | | | 711/104 |
| 2009/0089336 | A1 * | 4/2009 | Dewey | ................ | G06F 11/0778 |
| 2009/0106278 | A1 * | 4/2009 | Ramacher | ........... | G06F 11/0748 |
| 2010/0083043 | A1 * | 4/2010 | Niioka | ................ | G06F 11/0706 |
| | | | | | 714/23 |
| 2010/0332914 | A1 * | 12/2010 | Ueba | .................... | G06F 11/0778 |
| | | | | | 714/48 |
| 2012/0136858 | A1 * | 5/2012 | Aslot | ................. | G06F 17/30424 |
| | | | | | 707/737 |
| 2012/0304015 | A1 * | 11/2012 | Devegowda | .......... | G06F 11/079 |
| | | | | | 714/38.11 |
| 2012/0304019 | A1 * | 11/2012 | Li | ........................ | G06F 11/3037 |
| | | | | | 714/45 |
| 2013/0080502 | A1 * | 3/2013 | McColl | ................... | G06F 9/485 |
| | | | | | 709/203 |
| 2014/0047204 | A1 * | 2/2014 | Harman | .................. | G06F 3/065 |
| | | | | | 711/162 |

* cited by examiner

*Primary Examiner* — Loan L. T. Truong
(74) *Attorney, Agent, or Firm* — Thompson Hine LLP

(57) ABSTRACT

Mechanisms are provided for generating a system dump data structure based on device state data. A system dump operation is initialized in a data processing system and a device dump is requested by a dump manager from a device coupled to the data processing system. A collection scope data structure and disruption vector corresponding to the device are retrieved. The collection scope data structure specifies a set of one or more functions in the device for which to collect state data. The disruption vector specifies, for each of the one or more functions, a corresponding level of disruption that will be caused by the device dump. The device dump data is collected from the device in accordance with the collection scope data structure and the disruption vector and the system dump data structure is generated based on the collected device dump data.

20 Claims, 4 Drawing Sheets

DEVICE STATE CAPTURE DURING OPERATING SYSTEM DUMP

BACKGROUND

The present application relates generally to an improved data processing apparatus and method and more specifically to mechanisms for capturing device state during operating system dump operations.

Operating systems are comprised of many distinct components. Some of these components, e.g., device drivers, are responsible for managing devices attached to the host system, e.g., storage device disk volumes, ports of a network adapter, or the like. In some instances, multiple components, e.g., multiple device drivers, share management of a common device, e.g., an Ethernet device driver and a Fibre Channel device driver may both manage a network adapter such that both Ethernet and Fibre Channel communications through the ports of the network adapter are made possible. For example, a network adapter card may have multiple ports, each port being managed by a separate operating system (OS) component, or a device may provide multiple functions (using the Peripheral Component Interconnect (PCI) standard definition of a function), each managed by a distinct OS component.

When an operating system abnormally terminates, such as when there is a system crash or other critical error due to various factors including overflow write operations, hang conditions, race conditions, or the like, a data collection mechanism is invoked to preserve an image of the operating system state for later analysis, such as by performing a system or memory dump. The "dump" contains the contents of the state registers, system memory, and the like, which are "dumped" into one or more data structures for storage and later analysis.

This data collection is done by having a "dump manager" component, which is part of the OS, contact each of the other components, e.g., device drivers, which are referred to as the dump collectors. The dump manager requests each dump collector to gather and identify data to be included in the dump with the order in which these requests being made and their concurrency being indeterminate. The dump manager writes the collected data from the dump collectors to an external storage device by issuing Input/Output (IO) requests to a family of dump writer components, e.g., components managing a dump disk and a storage adapter or network adapter port through which the external storage device is accessed.

SUMMARY

In one illustrative embodiment, a method, in a data processing system comprising a processor and a memory, for generating a system dump data structure based on device state data. The method comprises initiating a system dump operation in the data processing system and requesting, by a dump manager of an operating system of the data processing system, a device dump from a device coupled to the data processing system. The method further comprises retrieving a collection scope data structure and disruption vector corresponding to the device. The collection scope data structure specifies a set of one or more functions in the device for which to collect state data. The disruption vector specifies, for each of the one or more functions, a corresponding level of disruption that will be caused by the device dump. The method further comprises collecting device dump data from the device in accordance with the collection scope data structure and the disruption vector, and generating the system dump data structure based on the collected device dump data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
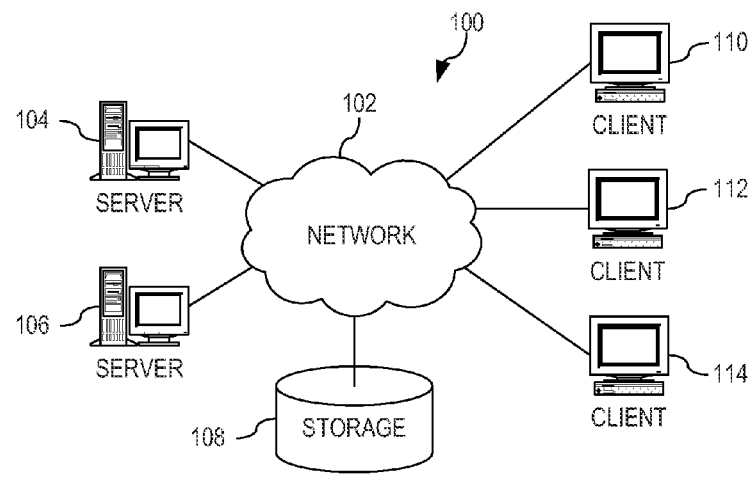
FIG. 1 is an example diagram of a distributed data processing system in which aspects of the illustrative embodiments may be implemented.

The illustrative embodiments provide mechanisms for capturing device, e.g., input/output (IO) adapter, network adapter, disk devices, USB devices, InfiniBand devices, Remote Direct Memory Access (RDMA) devices, printers, or the like, state during operating system dump operations. The illustrative embodiments provide mechanisms that are more flexible, uniform, and configurable than existing mechanisms for collecting system dump information.

That is, in existing mechanisms, the device drivers are hard-coded with various assumptions and rules for the device associated with the device driver. The illustrative embodiments, as described hereafter, do not require any hard-coded assumptions and rules in the device drivers and instead provide a more general formalization of the information needed to collect device state and provide a framework that can be common across all device drivers.

With regard to flexibility, consider that device drivers are often re-used for multiple generations of a product, i.e. the same device driver that managed a previous generation of adapters also manages the current generation adapters. If the scope of data collection or the disruption associated with a data collection changes, then, under the existing mechanisms the device driver must be updated to support the new adapter's data collection characteristics. This is undesirable for various reasons. Updating the device driver requires the vendor to expend software development resources, and deployment of new adapters requires a customer to coordinate a software update (to the new version of the device driver) with the installation of the new hardware. By contrast, with the mechanisms of the illustrative embodiments as described hereafter, a vendor would only need to provide the formal description of the new adapter's collection operation (which the vendor will have prepared for the "data sheet" or specification anyway) and the customer need not update to a new driver when installing the new adapter.

With regard to uniformity, device drivers for different devices are typically written by different software development teams. This will almost certainly be so for devices manufactured by different vendors, but can also be so for different families of devices by a single vendor, and even for different functions of a single device by a single vendor. For example, a vendor may have different development teams writing the Ethernet and Fiber Channel drivers for a Fibre Channel over Ethernet adapter. With existing mechanisms, it is not unusual for the various development teams to implement different data collection behaviors. This results in inconsistent data collection and thus, it is difficult to know what data will be collected without intimate knowledge of each of the various drivers. The mechanisms of the illustrative embodiment, as described hereafter, provide an organizing principle (and language) that spans across drivers, even from distinct vendors. This increases the likelihood that various development teams will settle on a common behavior and allows a customer to predict in advance what data will be collected, such as by review of the descriptive information and rules which are available to the end user, rather than by knowledge of the internal mechanisms of the device drivers which are not available to the end user.

With regard to configurability, existing mechanisms hard-code the data collection behavior in the device driver so that changing that behavior requires changing the device driver code. This requires action by the device driver writer and is not generally able to be performed by end users. In addition since the data collection behavior is hard-coded in the device driver, the data collection behavior will be common to all devices of that particular type managed by that device driver. It is difficult or impossible to instruct the device driver to be permissive with data collection for adapter 1, while being strict with data collection for adapter 2, for example. The mechanisms of the illustrative embodiments, as described hereafter, guide the data collection based on changeable configuration data, rather than hard-codings in the device driver. This makes it possible to allow end users to change the configuration as best fits them, including for any of all devices generally, all devices of a given type, or even for just a single device.

As mentioned above, when an operating system abnormally terminates, a dump manager component contacts dump collectors that collect data and provide it to the dump manager for use in storing state data for the operating system for later analysis, e.g., error analysis or the like. It is desirable that the dump collector components which manage a device, e.g., device drivers that operate as dump collectors, should include the device's state in the dump data since, for example, it is possible that a misbehavior or error in the device could have caused the crash of the operating system (OS). However, collection of the device state is often disruptive to the device. For example, in some adapters, when the operating system abnormally terminates, the device may write data to its own memory which is only accessible by the operating system after a reset of the device, or a function on the device, i.e. a disruption of the device operation.

Moreover, this disruption may extend beyond the bounds of the state that is being collected. For example, an Ethernet adapter which supports Fibre Channel over Ethernet functionality, may present an Ethernet function and a Fibre Channel function to the OS, each managed by a separate OS component. A device state capture by the Ethernet-managing component may include only the device's Ethernet state, but may disrupt both the Ethernet and Fibre Channel functionality. This raises problems for shared devices since it is not clear when it is safe to collect the device state since the data collection should not disrupt the dump writer component (i.e. the component that will write the dump data to an associated storage device for later analysis), for example, and it is further not clear which dump collector component should collect the state data. For example, if the error is detected by a component associated with the Ethernet function, but the error affects the Fibre Channel function as well, if the Ethernet function's related component is the dump collector, then the Ethernet component may not collect data related to Fibre Channel function state.

One solution to this problem is to allow each dump collector component to inspect the state of the other OS components at dump time. The dump collector component can use the state information to determine what other components are associated with the device, whether any components are the dump writer, and whether any components have already captured the device state. However, this assumes that each component knows where to find, has access to, and can understand the other component's states, which is generally not the case. Thus, this possible solution is limited to devices with only a single associated OS component type with weak separation between OS component instances.

Another solution is to establish a communication protocol among components which can be used prior to the system dump to coordinate a plan for data collection, were a system dump to occur. This is a robust solution, but requires significant effort to implement the communication mechanism in the OS and among all the participating components.

The illustrative embodiments recognize that modern multi-function multi-protocol adapters, such as IO adapters, network adapters, or the like, for instance, have hardware states and firmware states that need to be collected for problem determination, above and beyond the operating system state data collected by known system dump mechanisms which do not, as part of the system dump, collect such data from devices coupled to the host system. Here, it should be appreciated that operating system state data includes state data for the operating system and its device drivers. To the contrary, device state data is data that is stored internal to the device itself and represents the state of the device.

The data collection is done by a device (e.g., adapter) firmware dump which can take various forms, depending on the device. For example, the device driver may dump the firmware by reading values from registers of the device. Alternatively, the device driver may send a command which causes the device to dump its firmware state to a file system on an internal flash device for later retrieval by the device driver. The firmware running on a given device, which will be assumed to be an adapter hereafter for simplicity of the description, may be common across functions of the same protocol or across protocols.

When trying to dump adapter firmware on a multifunction adapter, the function that discovered the problem or initiated the dump may affect other functions which may or may not have experienced any problems. Depending on the protocol and the severity of the disruption, an unexpected disruption may lead to catastrophic loss or corruption of data. Therefore, the illustrative embodiments provide mechanisms to determine the scope of the disruption for all functions/protocols and communicate the scope of the impending disruption so that sibling functions can take appropriate action or the data collection as part of a system dump operation may be aborted.

With the mechanisms of the illustrative embodiments, devices specify their system dump parameters to the OS in advance of the system dump occurring. These parameters include a collection scope attribute and a disruption vector attribute. The collection scope attribute specifies the set of functions of the device whose data are captured together as a whole if any one of the functions in that collection scope initiates a device state capture. The disruption vector attribute specifies, for each function of the device, a level of disruption that will be suffered by all the various functions due to initiation of a state capture by that function. Thus, each function of a device has an associated collection scope and disruption vector. The collection scopes and disruption vectors may be shared among multiple functions. For example, a two function (0, 1) device may indicate that a data collection operation by either function will include device state for both functions, i.e. a single collection scope.

With the mechanisms of the illustrative embodiments, there is one device state data collection initiator nominated per collection scope. For example, consider an adapter with 4 functions: 0 & 1 Ethernet, and 2 & 3 Fibre Channel. This adapter may describe its collection scopes as: 0=>{0,1}, 1=>{0,1}, 2=>{2}, 3=>{3}. That is, a device state collection initiated by Ethernet function 0 will include internal device state data for functions 0 and 1, while a device state collection initiated by Fibre Channel function 3 will include internal device state data only for function 3, etc. In this example, the adapter has 3 distinct collection scopes ({0, 1}, {2}, and {3}). Thus, there would be 3 device collection initiators needed during a system dump operation. Which functions will be chosen as device state data collection initiators will be based on the particular logic implemented for selection of a device state data collection initiator (e.g., in the above example, it can be seen that the device state data collection initiators will be: one or the other of functions 0 and 1, function 2, and function 3). Whether the chosen device state data collection initiators will actually perform an internal device state data collection will further depend on the disruption vectors and other rules, as described in greater detail hereafter.

The system dump parameters passed by the device to the OS in advance of the system dump, are processed by the dump collectors (components, such as device drivers, that operate to collect dump data for inclusion in a system dump data structure) at system dump time, using a set of rules to determine which, if any dump collector should capture the device state. The rules for determining a device state data capture initiator, or simply capture initiator, from among the dump collectors associated with a collection scope, are tunable and may be overridden by the device itself or by a system administrator. In some illustrative embodiments, these rules for determining the capture initiator may specify a particular function for a particular collection scope, or that is generic across multiple collection scopes, whose corresponding OS component is to be used as the capture initiator. In other illustrative embodiments, the rules may be of a more generically descriptive nature, such as a "lowest/highest numbered function", a "lowest numbered Ethernet function", a "highest numbered Fibre Channel function", or the like.

This differs from prior art mechanisms which hard code the state capture device into the OS component that manages the device. With this prior art mechanism using hard coded state capture device identification, an OS component that is configured to service one device would not be suitable for managing a device with different state capture characteristics and OS components may need to be updated over time to accommodate new state capture characteristics even for closely related devices, such as a newer generation of devices in the same hardware family. The illustrative embodiments, however, allow a common OS component implementation to safely and reliably perform state capture for any device whose characteristics can be described by the set of parameters recognized and described above.

The rules may similarly provide logic for determining which component and corresponding function is the dump writer. The rules may specify what assumptions a function may make about whether the other functions are the dump writer or not. A function presumably knows with certainty whether it is the dump writer or not. This may be expressed in terms of what to assume about other functions such as, "assume function 0 is the dump writer," "assume non-0 is not the dump writer," or "assume Ethernet functions are not the dump writer". It is important to know which function is/is not the dump writer so as to ensure that any disruption will not affect the dump writer. This is because disruption of the dump writer will cause essential data to be lost in the event of a catastrophic error.

In addition, the rules may specify a disruption tolerance for each of the functions of the device. Alternatively, the disruption tolerance may be passed by the device to the OS as a parameter along with the collection scope and disruption vector. The disruption tolerance can be expressed simply as a level of disruption, e.g., "Dump Writer can tolerate only PAUSE", or as a level of disruption coupled with a function identifier or type, e.g., "Function 0 can tolerate Pause," or "Ethernet functions can tolerate Reset." The collector, dump writer, or disruption tolerance information can be specified in advance as static assumptions, e.g., NIC functions should always assume that Fibre Channel adapters are dump writers.

With these mechanisms, the illustrative embodiments, prior to a system dump occurring, the OS components, e.g., device drivers, associated with the device, functions (or aspects) of the devices, or the like, retrieve the collection scopes, disruption vectors, disruption tolerance, and rules for the various functions (aspects). As part of a system dump, the dump manager contacts each component (now known as the dump collector) to obtain state data for inclusion in system dump data. Each dump collector compares its associated functions' function name (e.g., function 0, function 1, etc.) and function type (e.g., Ethernet, Fibrechannel, SCSI, etc.) against the collection scope and collector rules to determine if the dump collector should be the one to capture the device state data. If not, the operation terminates for this data collector with only the collector's OS device driver data being provided to the dump manager and not the internal device state data from the device.

If the dump collector should be the collector of device state data for the associated collection scope, the dump collector next considers each of the functions described in the disruption vector against the writer rule to determine whether any of the disrupted functions should be assumed to be the dump writer. If not, then the device state is captured by the dump collector. If any of the disrupted functions must be assumed to be the dump writer, the dump collector next compares the dump writer's disruption type from the disruption vector against the disruption rule to determine whether the dump writer can tolerate the disruption that will result from the device state capture operation. If the disruption cannot be tolerated, then the device state capture operation is not performed. If the disruption can be tolerated, then the device state capture operation is performed. In any event, the dump collector also includes its OS device driver data in the data being provided to the dump manager.

As a result, the illustrative embodiments provide mechanisms for obtaining device state information from devices coupled to the host system when there is a system dump due to an abnormal termination of an operating system. The illustrative embodiments take into consideration the scope of data that is collected from the device, the disruption level, and the amount of disruption that is tolerable by the dump writer data collector. In addition, rules are utilized to determine which data collector is to be assumed to be the dump writer. As a result, device state data is collected from devices in a manner that does not disrupt the operation of the dump writer such that data is lost and which ensures that the system dump files that are written are complete and include state data for the devices, e.g., IO adapter, network adapter, or the like.

It should be appreciated that, rather than terminating data collection in the event that the disruption level exceeds the disruption tolerance for a function, the mechanisms of the illustrative embodiments may further provide logic for ordering data collection operations in an optimal way. Data collection and dump writing may be performed first for all dump collectors which are not at risk of intolerably disrupting a dump writer. Only after that data collection is complete (with the data written safely to an external storage device), the OS may perform data collections which are at risk of disrupting a dump writer, with the components now being free to disrupt. In this manner, all state data which can be collected safely will be, and state data which can be collected with risk may be, but without jeopardizing the safe collection.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
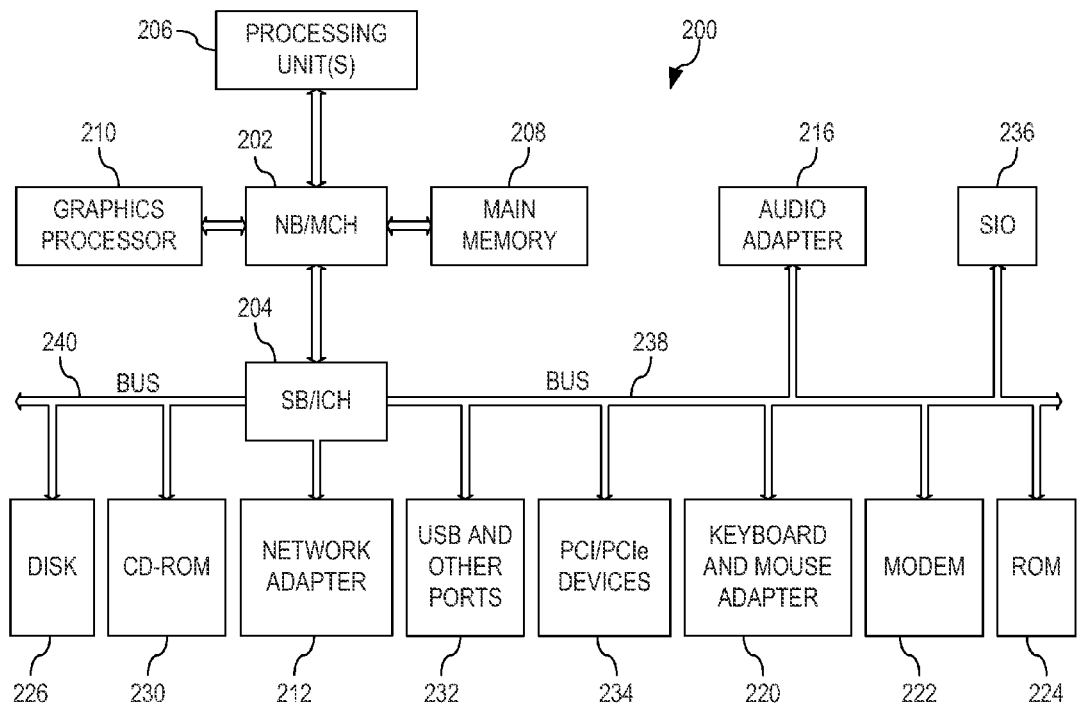
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIGS. 1 and 2, one or more of the data processing systems, e.g., servers 104, 160 or clients 110-114, or the like, may implement mechanisms of the illustrative embodiments to perform enhanced system dump operations that include collecting device data from devices coupled to the data processing systems, e.g., IO adapters, network adapters, USB devices, disk devices, InfiniBand devices, printers, or the like. With reference to FIG. 2, for example, these devices may be any of the PCI/PCIe devices 234, e.g., Ethernet adapters, add-in cards, and PC cards, network adapter 212, or the like.

With any of these data processing systems, it is possible that the operating system on the data processing system may experience an abnormal termination. In such a case, the mechanisms of the illustrative embodiments are implemented to generate an enhanced system dump that includes the device state data for functions (or aspects) of the devices, or the devices themselves, while taking into consideration the scope of the data collection that will be needed to be performed, the amount of disruption that will be caused to the functions (or aspects) of the device in order to perform such device state data collection by the dump collectors, the level of disruption that the dump writer for the device can tolerate without causing a loss of data in the device dump that is to be included in the system dump, and the like.

Figure 3:
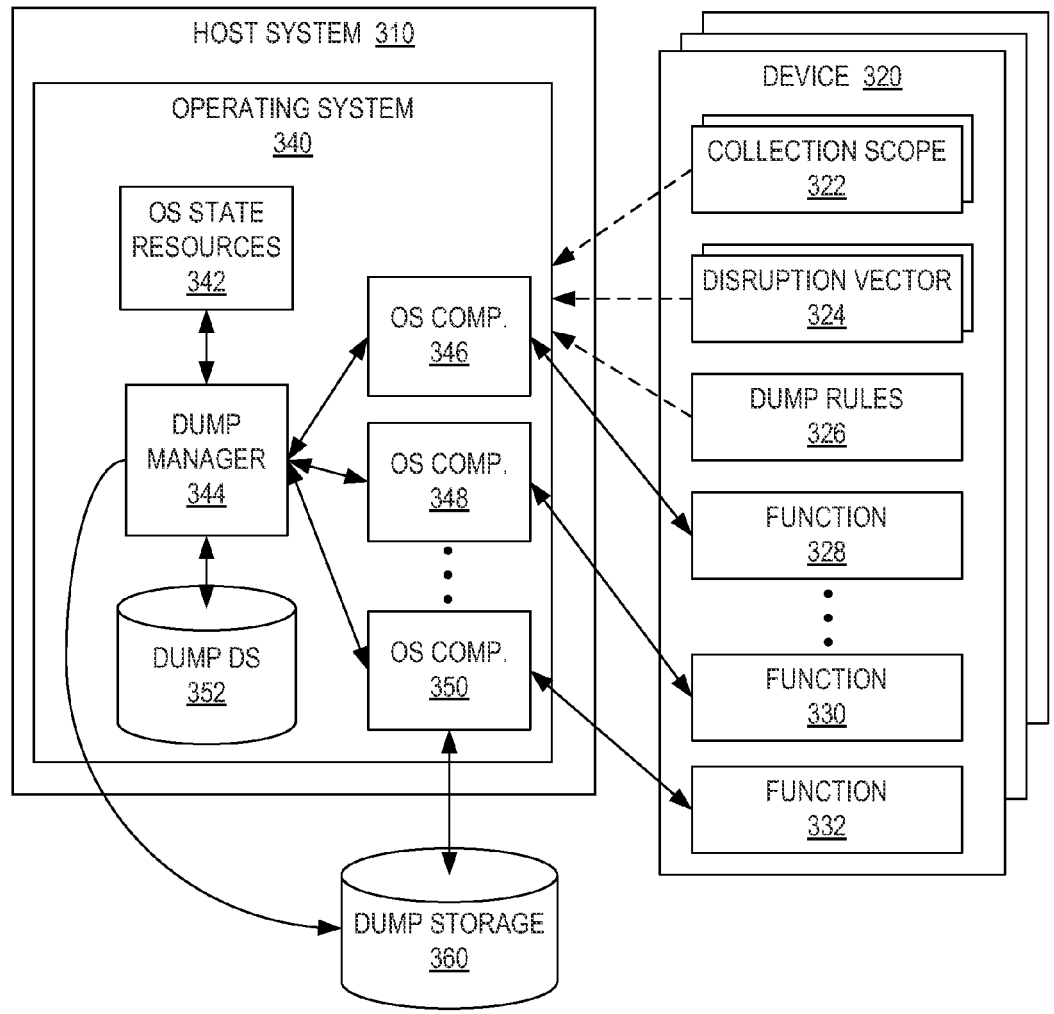
FIG. 3 is an example block diagram illustrating the primary operational elements for system dump processing in accordance with one illustrative embodiment.

FIG. 3 is an example block diagram illustrating the primary operational elements for system dump processing in accordance with one illustrative embodiment. As shown in FIG. 3, the primary operational components comprise a host system 310 and one or more devices 320 coupled to the host system 310, such as by way of a data/communication interface, bus interface, or the like. As mentioned above, the devices 320 may be any type of device that is capable of being coupled to the host system to perform a desired function including, but not limited to, network adapters, add-in cards, PC cards, IO adapters, or the like. These devices 320 may provide one or more functions (or aspects) that may be utilized by the host system to perform various operations. For example, the device 320 may be a multi-function multi-protocol network adapter with a separate function for Ethernet communications, a separate function for Fibre Channel communications, and/or the like. For purposes of the following discussion, it will be assumed that the device 320 is a multi-function network adapter.

The device 320 comprises configuration data for defining the conditions for data collection in the event of an abnormal termination of the operating system 340 of the host system 310. This configuration data comprises one or more collection scopes 322, one or more disruption vectors 324, and dump rules 326 (which may be considered optional if dump rules 352 are already specified in the operating system 340 of the host system 310). The device 320 further provides one or more functions 328-332 with which the operating system (OS) 340 operates to perform operations via the device 320. The collection scopes 322 and disruption vectors 324 are each associated with the one or more functions 328-332. In one illustrative embodiment, the device 320 is a multi-function multi-protocol network adapter where function 328 may be provided to the OS 340 for performing Ethernet communications and function 330 may be provided to the OS 340 for performing Fibre Channel communications.

The collection scope 322, disruption vector 324, and dump rules 326 (if any), may be communicated by the device 320 to the OS 340 prior to a system dump operation occurring, such as in response to the device 320 becoming operational with the host system 310. That is, when the device 320 is coupled to the host system 310, the device 320 may be initialized and during this initialization process, the device 320 may communicate to the OS 340 the collection scope 322, disruption vector 324, and dump rules 326. This information may be stored in one or more dump data structures (DS) 352 associated with the dump manager 344 and accessible by OS components 346-350 that are responsible for managing the various functions 328-332 of the device 320.

The collection scope 322 of the device 320 specifies a set of functions whose data is captured as a whole, i.e. if any one of the functions' data is collected as part of a device dump operation, all of the functions in the collection scope have their data collected as part of the device dump. There may be multiple collection scopes 322 specified for various combinations of functions 328-332 of the device. For example, one collection scope 322 may comprise functions A, B, and C whereas another collection scope may specify functions D, E, and F. Thus, a collection scope may be specified as a vector of function identifiers such as {0, 1, 2, 3} or the like, indicating a set of functions whose data will be collected as a whole.

Each device function 328-332 has an associated disruption vector 324 that specifies the level of disruption that would be suffered by the various functions 328-332 if the function initiated a device state collection. The disruption vector 324 may take many different forms, but in one illustrative embodiment, comprises a vector of functions and their corresponding disruption type, with there being a separate disruption vector 324 for each potential device state data collection initiator function 328-332. For example, assume that the device 320 is a network adapter having 2 ports, each presenting 2 functions to the OS 340 for use. For example, each port may present 2 distinct function types (Type X and Type Y) as follows:

Port A, Type X: function 0
Port B, Type X: function 1
Port A, Type Y: function 2
Port B, Type Y: function 3

Assume data capture for either Type X function disrupts all functions severely with a full reset of the function and data capture for either Type Y function only disrupts that single function mildly with a brief pause. Under these assumptions, the disruption vectors associated with the functions might look like the following, where the "initiator" is the function that initiates the device state data collection:

Initiator 0: {0:RESET, 1:RESET, 2:RESET, 3:RESET}
Initiator 1: {0:RESET, 1:RESET, 2:RESET, 3:RESET}
Initiator 2: {2:PAUSE}
Initiator 3: {3:PAUSE}

If a disruption vector does not mention a function, it is assumed that that function will not be disrupted by the device dump's state data collection operation.

The dump rules 326 specify the criteria and assumptions that the device OS components 346-350 associated with the device 320 may use when identifying a dump collector, a dump writer, and a disruption tolerance for functions of the device 320. The rules 326 may be specific to individual functions 328-332 of the device 320, and/or individual collection scopes 322, or may be of more general applicability across all of the functions 328-332 or collection scopes 322. Furthermore, the dump rules 326 may not be specified by the device 320 itself and may instead have already been configured in the OS 340, such as in the dump data structures 352, e.g., default or generic dump rules that are used for the device 320 or across all devices 320 coupled to the host system 310.

The dump rules 326 may generally be considered of three different types: dump collector rules, dump writer rules, and disruption tolerance rules. The dump collector rules specify, for any given collection scope, which function of the collection scope should be considered the one that will capture the device state data for all of the functions in the collection scope and communicate that data back to the dump manager 344 for inclusion in the system dump to dump storage device 360. For example, if the collection scope comprises functions 0, 1, 2, and 3, the dump collector rules specify which of these functions will be used to collect all of the state data for all of functions 0, 1, 2, and 3 and provide that state data back to the dump manager 344. These rules may be specified by specifically identifying the function that is to be used, e.g., "function 0", or may be specified in more general descriptive terms such that the rule is applicable to multiple collection scopes, e.g., "lowest/highest numbered function". The rules may be specific to function types as well, e.g., "lowest/highest numbered Ethernet function" or "lowest/highest numbered Fibre Channel function".

The dump writer rules are similar to the dump collector rules but specify, for any given function, what assumptions can be made regarding which function in its disruption scope is the dump writer. That is, the function that is the dump writer knows that it is the dump writer, however the other functions do not necessarily know which other function is the dump writer and must be given criteria by which to determine which other function is likely the dump writer. The dump writer rules give the criteria for making assumptions as to whether other functions are likely to be the dump writer or not. For example, a dump writer rule may specify "assume function 0 is the dump writer", "assume non-0 functions are not the dump writer", "assume Ethernet functions are not the dump writer", "NIC functions should always assume that Fibre Channel functions are dump writers", and the like.

The disruption tolerance rules specify what each function can assume about the disruption tolerance of the dump writer function. That is, it is important to not disrupt the dump writer function when it is performing its operations as a dump writer because this may result in a loss of device dump state data when performing the system dump operation. As a result, the functions of the device must know, or assume, a level of disruption that is tolerable to the dump writer so that it may be compared with the expected level of disruption that will be caused by the data collection operation when a system dump occurs. The disruption tolerance rules may be expressed as a level of disruption, e.g., "dump writer can tolerate only PAUSE", or as a level of disruption coupled with a function identifier or type, e.g., "function 0 can tolerate PAUSE", "Ethernet functions can tolerate RESET", or the like.

While it is described above that the collection scope 322, disruption vector 324, and dump rules 326 are communicated to the operating system 340 prior to any system dump operation, and specifically when the device 320 initializes or becomes operational with the host system 310, this is not required. This information may also be communicated to the OS 340 of the host system 310 during runtime, but in advance of the system dump operations being performed. For example, the dump collector rule may describe an inherent aspect of the device ("best to collect via function 0"), or may specify an aspect of the OS ("Admin prefers collection via Ethernet function"). Thus, the dump collector rule may be specified either by the device or the OS. The dump writer rule and tolerance of disruption rule are more likely to describe a preference or aspect of the OS, and are correspondingly more likely to be specified by the OS. Further, the Administrator of the OS may wish to change the rules after the device has been configured into the system, but still in advance of the system dump. For example a dump writer rule "Assume Fibre Channel functions are the dump writer" may be removed or negated if the Administrator knows that the system dump device is in fact attached instead to a SCSI adapter. Whether specified by the OS, by the device, or by an overriding of the information by an Administrator, the information should be provided prior to a system dump operation that is to use this information to implement the mechanisms of the illustrative embodiments.

The host system 310 comprises the operating system 340 which in turn comprises a dump manager 344 and one or more OS components 346-350 for managing devices coupled to the host system 310. The OS 340 may further comprise OS state resources 342 and dump data structures 352. The dump manager 344 is responsible for controlling and coordinating the operation of the OS components 346-350 for performing system and device dump operations in the event of an error condition occurring, such as an unexpected termination of the operating system 340. In operation, the dump manager 344 may remain idle while the OS 340 is operating normally. When an abnormal termination of the OS 340 is detected, all other OS activity may be brought to a halt and control is passed to the dump manager 344. The dump manager 344 and OS components 346-350 (dump collectors) still rely on the state of the now-terminated OS to some extent, but minimize their reliance on that state as far as possible and cannot use normal OS services. This limited mode of operation is one of the reasons why the mechanisms of the illustrative embodiments are needed, i.e. the lack of normal facilities for inter-component communication while in a system dump mode of operation is what is being worked around.

The OS components 346-350 are management components of the OS 340 that are associated with particular devices 320 coupled to the host system 310. There may be a separate instance of an OS component for each function 328-332 of the device 320. For example, the OS component may be a device driver with separate instances of the device driver being provided for each of the functions 328-332 of the device 320, i.e. OS components 346-350. The OS components may be any logic of the OS 340 used to manage the device 320 including, but not limited to, device drivers, kernel services, or the like. One or more of these OS components 346-350 may be designated as a dump collector or dump writer. The particular OS component 346-350 that is designated as the dump collector or dump writer may be static or may be dynamically determined based on collection scope, dump rules, or the like.

The dump data structure 352 stores the dump configuration data for devices 320 coupled to the host system 310. This dump configuration data may comprise the collection scopes 322, disruption vectors 324, and dump rules 326 associated with the device 320. The dump data structure 352 is accessible by the OS components 346-350 during the system dump data collection so as to determine which OS component 346-360 is the dump collector and to determine whether and how to perform device dump data collection from the device 320 without disrupting the functions 328-332 of the device 320 beyond a disruption tolerance.

The OS state resources 342 represent other sources of operating system state data that may be accessed to generate a system dump that is written to the dump storage 360. The system dump and device dump data are collected into data structures that are written to the dump storage 360 for later analysis to determine sources of errors in the host system 310 or devices 320. It is important to have both operating system state data and device state data, obtained from a firmware dump of state data from the device 320, in such dump data structures since the source of the errors leading to an abnormal termination of the operating system 340 may be within the operating system 340 itself, or may be due to problems in the operation of the device 320, which may not be identifiable from OS state data itself.

In operation, it is assumed that prior to a system dump operation being performed, the OS components associated with the device retrieve the collection scopes, disruption vectors, and dump rules associated with the device. This may be done at initialization of the device, at runtime in response to the detection of a need to perform a system dump and/or device dump operation, or the like. The OS 340 determines that a system dump operation is necessary and instructs the dump manager 344 to initiate the system dump operation. The dump manager 344 contacts each of the OS components 346-350 (now known as dump collectors) to request that they perform a device dump operation. Each dump collector 346-350 compares the function name and function type or its associated function 328-332 against its associated collection scope and collector rules to determine if it should be the function to capture the device state data for the collection scope and provide it to the dump manager 344. For example, if the dump manager 344 contacts dump collector 346, then the associated collection scope may indicate that a device state collection by collector 346 would include data for device functions 328 and 330. If the collection rules for that collection scope nominate collector 346 as the appropriate initiator (and if the disruption rules do not disallow), then collector 346 will initiate a device state dump operation. When dump manager 344 contacts OS component 348 (now dump collector 348), collector 348 will find that it shares the collection scope (again, containing functions 328 and 330), but the associated collection rules had nominated collector 346, rather than collector 348, as the device state dump initiator so dump collector 348 will not initiate a device state dump.

The collector rules associated with the collection scope 322 may be used as a basis for determining whether the particular OS component, e.g., 346, is to be the OS component to capture the device state from the functions in the collection scope 322. Thus, if a collection scope 322 indicates that the scope comprises function 328 and function 330, and function 328 is an Ethernet function and function 330 is a Fibre Channel function, if the collector rule specifies that the dump collector is the lowest numbered Ethernet function, then the OS component 346 associated with the function 328 would be selected as the dump collector. This may be done by each of the OS components to determine if they should be considered a dump collector.

It should be appreciated that multiple dump collectors may be designated, one for each collection scope on the device. The collector rules are associated with the collection scopes 322. It is generally desirable that the associated collector rules be sufficient to determine a single collecting function within the collection scope. Determining a single function for each collection scope limits the opportunity for disruption and prevents unnecessary duplication of collection effort and data. In certain cases, it may be desirable that the collection rules determine multiple collectors within the collection scope. For example, if the various functions have different disruption vector or writer rules, then determining multiple collectors may increase the chances that at least one of the collectors can retrieve the device data for the collection scope without disrupting the dump writer.

The dump collector further considers each of the functions described in the disruption vector(s) associated with the function against a dump writer rule to determine whether any of the disrupted functions should be assumed to be the dump writer and if the dump writer can tolerate the level of disruption specified in the disruption vector. That is, if dump writer rule specifies "assume function 0 is the dump writer" and function 0 is included in the disruption vector, then it is likely that the dump writer will be disrupted be the device dump operation. Thus, the dump writer rule specifies who the dump writer can be assumed to be and based on this assumption, it can be determined whether the likely dump writer is listed in the disruption vector.

If the dump writer is listed in the disruption vector, one option is to immediately terminate the device dump operation. However, in other embodiments, it is further possible that the dump writer can withstand certain levels of disruption without severely negatively affecting the device dump operation. Hence, if the dump writer is listed in the disruption vector, the level of disruption in the disruption vector corresponding to the dump writer is compared against the disruption tolerance rules to determine if the dump writer can withstand the disruption. If it is determined that the disruption tolerance for the dump writer is greater than the level of disruption specified in the disruption vector, then the device dump is performed. If not, then the device dump may be aborted. For example, if the disruption tolerance rule specifies that the dump writer can tolerate a PAUSE, and the disruption vector indicates the level of the disruption to be a PAUSE, then the device dump is permitted to continue even though the dump writer is going to be disrupted mildly. If the disruption tolerance rule specifies that the dump writer can tolerate a PAUSE, and the disruption vector indicates the level of disruption to be a RESET, then the device dump may be aborted.

In one illustrative embodiment, the disruption vector may further be used to determine what other functions of the device 320 are likely to be severely disrupted as part of the data collection, e.g., RESET disruption. For those functions, the data collection operation may be delayed. For example, the dump manager 344 could contact each OS component under the normal rules to collect all of the data that is available without risk of intolerable disruption while noting any components that did not collect due to the writer and tolerance of disruption rules. Only after the initial data has been collected and safely written to the dump storage device 360, dump manager 344 could relax the dump writer or tolerance of disruption rules and contact the previously-uncollected components again. This introduces a risk that some device's collection may disrupt further writing to the dump device (and so bring the effort to an early end) but only after all the safely-collectable data has already been saved. And it may happen that the dump writer is not disrupted by the additional collection, in which case more complete data is collected.

Thus, the illustrative embodiments provide mechanisms for obtaining the state data from devices coupled to the host system, such as via a firmware dump, for inclusion in system dump data structures for later analysis. The mechanisms of the illustrative embodiments facilitate such device dump operations while taking into consideration the dump collector, dump writer, and tolerable disruption level for the dump writer. Moreover, in some illustrative embodiments, the tolerable disruption level for other functions may also be considered to thereby quiesce these other functions so that the device dump data collection can be performed in a non-disruptive manner.

Figure 4:
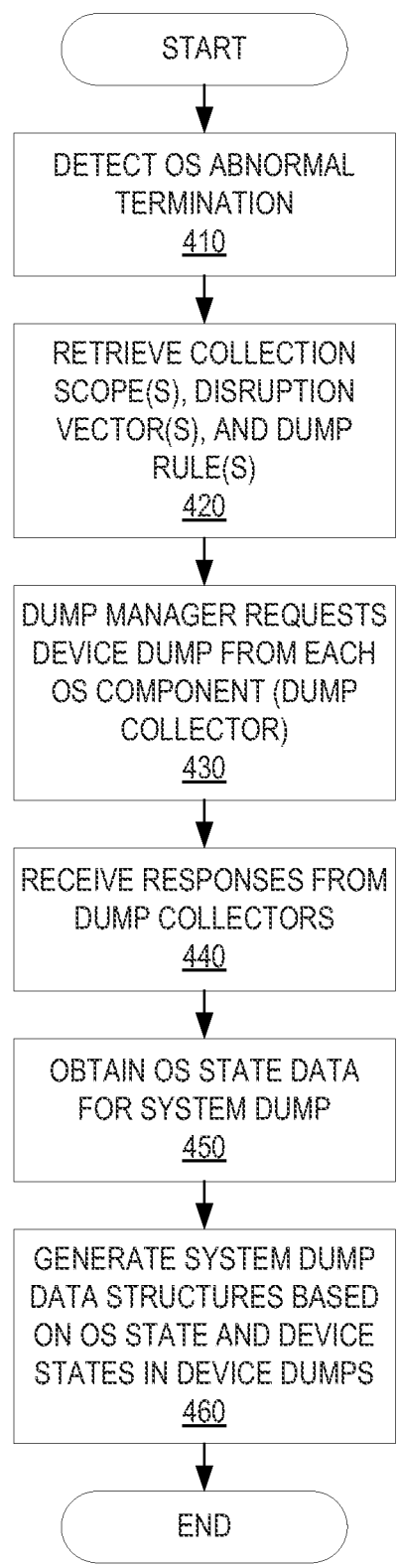
FIG. 4 is a flowchart outlining an example operation for performing a system dump operation in accordance with one illustrative embodiment.

FIG. 4 is a flowchart outlining an example operation of for performing a system dump operation in accordance with one illustrative embodiment. As shown in FIG. 4, the operation starts with the detection of an abnormal operating system termination event or other type of error event requiring a system dump of the state of the operating system and device state (step 410). The collection scopes, disruption vectors, and dump rules for the devices coupled to the host system are retrieved either from a host system storage in the case where this information has been previously communicated to the host system, or directly from the devices themselves at runtime in response to the detection of the abnormal operations system termination event (step 420). The dump manager requests device dump operations to be performed from each OS component (step 430).

The dump manager receives responses from the OS component that is determined to be the dump collector (step 440). These responses may be messages indicating that the device dump was completed successfully and may provide the device state data collected by the dump collector from the firmware of the device indicating the state of the functions included in the collection scope. Alternatively, if a device dump could not be completed successfully, the failure may also be reported in a response message and that failure may be logged as part of the system dump data structures. Further, the responses may indicate that a device data collection was not initiated and whether that was due to a collector rule, writer rule, or tolerance of disruption rule.

In addition to the device dump state data collected by the dump collectors for the various devices, the dump manager further collects the operating system state data for inclusion in the system dump data structures (step 450). The system dump data structures are then generated based on the operating system state data and the device dump state data collected using the dump collectors for the various devices. These system dump data structures are written to a system dump storage by an OS component determined to be the dump writer (step 460). The operation then terminates.

Figure 5:
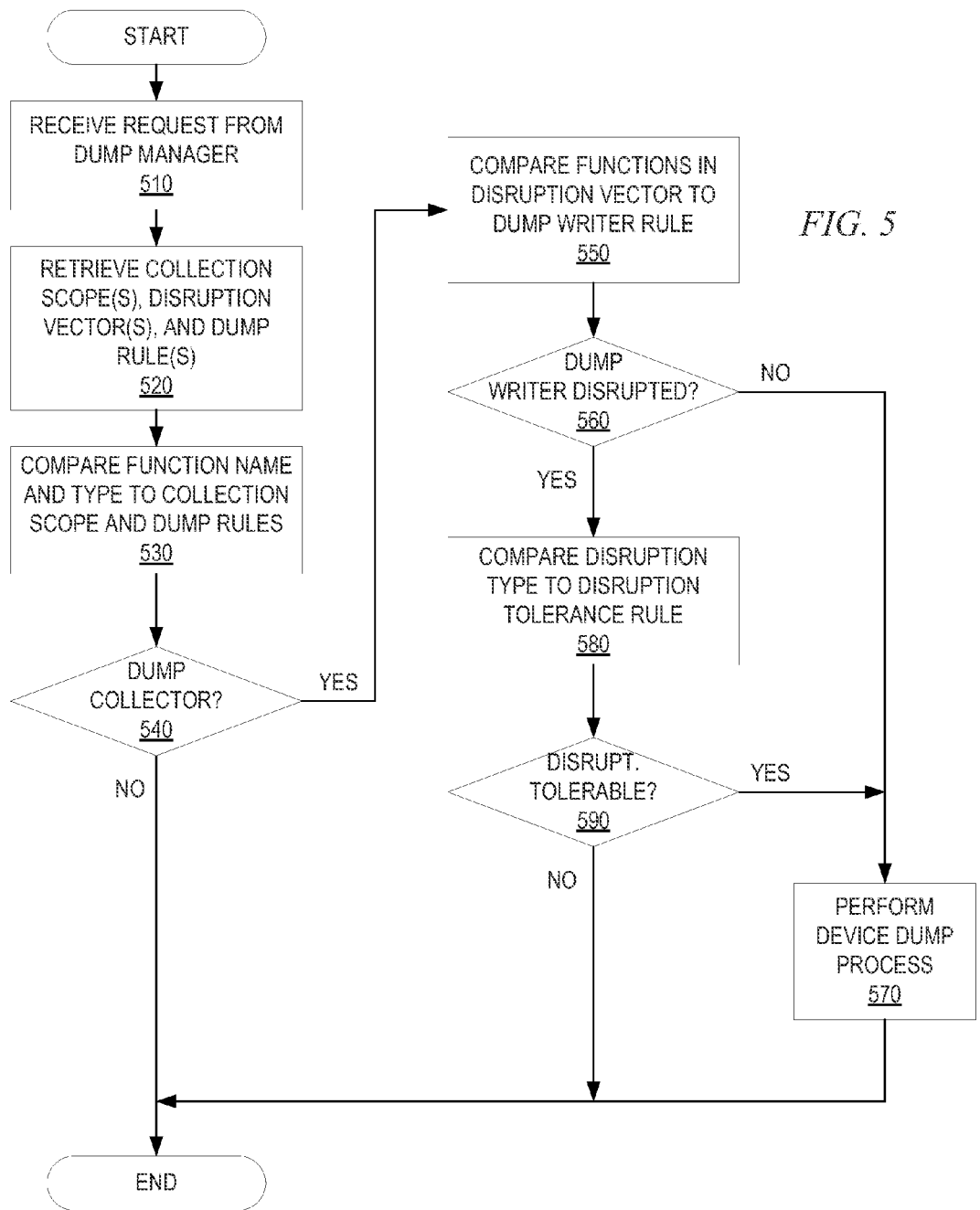
FIG. 5 is a flowchart outlining an example operation of an OS component when performing a device dump operation in accordance with one illustrative embodiment.

FIG. 5 is a flowchart outlining an example operation of an OS component when performing a device dump operation in accordance with one illustrative embodiment. It should be noted that while FIG. 5 is described with regard to a single OS component, this process may be performed for each of a plurality of OS components, either serially or at approximately a same time in parallel.

As shown in FIG. 5, the operation starts with receiving a request from the dump manager to perform a device dump (step 510). The OS component retrieves the collection scope, disruption vector, and dump rules for the corresponding device function (step 520) and compares the function name and function type of the corresponding function to the collection scope and dump rules (step 530). A determination is made as to whether the OS component should be the dump collector for collecting the dump data from the functions specified in the collection scope (step 540). If not, the operation terminates.

If the OS component is to be the dump collector for collecting the dump data from the functions specified in the collection scope, then the OS component compares the functions in the disruption vector to the dump writer rules in the dump rules (step 550). A determination is made as to whether any of the disrupted functions should be assumed to be the dump writer (step 560). If no, then the device dump data capture process is performed (step 570).

If one of the disrupted functions is assumed to be the dump writer, the assumed-writer function's disruption type specified in the disruption vector is compared against a disruption rule in the dump rules (step 580). A determination is made as to whether the OS component that is assumed to be the dump writer can tolerate the level of disruption specified in the disruption vector (step 590). If not, the operation terminates. If the disruption can be tolerated by the dump writer, then the device dump data capture process is performed (step 570) and the operation terminates. It should be appreciated that the dump data capture process involves collecting the state data for the functions specified in the collection scope and providing the collected data to the data collector. The dump collector then provides the captured device dump data to the dump manager OS component for writing the state data to a device dump data structure, which may be part of a set of system dump data structures, via the dump writer.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for generating a system dump data structure based on device state data, the method comprising:
    initiating a system dump operation in the data processing system;
    requesting, by a dump manager of an operating system of the data processing system, a device dump from a device coupled to the data processing system;
    retrieving a collection scope data structure and disruption vector corresponding to the device, wherein the collection scope data structure specifies a collection scope comprising a set of one or more functions in the device for which to collect state data, and wherein the disruption vector specifies, for each of the one or more functions, a corresponding level of disruption that will be caused by the device dump;
    collecting device dump data from the device in accordance with the collection scope data structure and the disruption vector; and
    generating the system dump data structure based on the collected device dump data.

2. The method of claim 1, wherein the collection scope data structure and disruption vector are communicated by the device to the operating system prior to initiating the system dump operation, and wherein each function of the device has an associated collection scope data structure and disruption vector.

3. The method of claim 1, wherein collecting device dump data from the device comprises:
    selecting a function from the set of one or more functions in the collection scope to be a device state data collection initiator for the collection scope based on a device state data collection initiator selection rule, wherein a device driver associated with the device state data collection initiator initiates collection of device state data from the device for other functions in the collection scope.

4. The method of claim 1, wherein the data collection initiator selection rule is defined in terms of at least one characteristic of functions in the device, and wherein the data collection initiator selection rule is applicable to a plurality of collection scopes of one or more devices coupled to the data processing system.

5. The method of claim 1, wherein collecting device dump data from the device comprises:
    applying one or more device state dump writer rules to the collection scope to determine whether a function in the set of one or more functions is to be assumed to be a device state dump writer function;
    determining, in response to a determination that a function in the set of one or more functions is to be assumed to be a device state dump writer function, whether the device state dump writer function will be disrupted by the device dump, based on the disruption vector; and
    configuring the collecting of the device dump data based on the determination of whether the device state dump writer will be disrupted by the device dump.

6. The method of claim 1, wherein configuring the collecting of the device dump data comprises configuring the collecting of device dump data such that device dump data is collected for functions of the device in order of a level of disruption to the functions of the device, wherein the order prioritizes collection of device dump data from functions having a relatively less severe level of disruption prior to functions having a relatively more severe level of disruption.

7. The method of claim 1, wherein determining whether the device state dump writer function will be disrupted by the device dump further comprises:
    determining, based on the disruption vector, a disruption level for the device state dump writer function;
    determining, based on a disruption rule, whether the disruption level for the device state dump writer function exceeds a disruption tolerance for the device state dump writer; and
    terminating the device dump in response to the disruption level for the device state dump writer function exceeding the disruption tolerance.

8. The method of claim 1, further comprising:
    retrieving dump rules specifying at least one dump collector rule, at least one dump writer rule, and at least one disruption tolerance rule, wherein the at least one dump collector rule specifies criteria for selecting a dump collector function from the set of one or more functions of the collection scope, the at least one dump writer rule provides assumptions for assuming which functions in the set of one or more functions of the collection scope are to be assumed to be dump writer functions, and wherein the at least one disruption tolerance rule specifies a disruption level tolerance for functions in the set of one or more functions of the collection scope; and
    applying the dump rules to the collection scope and disruption vector to configure the device dump to maximize device dump data that is collected from the device, wherein the device dump date is collected in accordance with the configuring of the device dump.

9. The method of claim 1, wherein the device is one of a multi-function input/output adapter or a multi-function network adapter.

10. The method of claim 1, wherein the device is a multi-function multi-protocol network adapter, and wherein a first function of the multi-function multi-protocol network adapter supports a first network communication protocol and a second function of the multi-function multi-protocol network adapter supports a second network communication protocol.

11. A computer program product comprising a computer readable storage medium having a computer readable program stored therein, wherein the computer readable program, when executed on a computing device, causes the computing device to:
- initiate a system dump operation;
- request, by a dump manager of the computing device, a device dump from a device coupled to the computing device;
- retrieve a collection scope data structure and disruption vector corresponding to the device, wherein the collection scope data structure specifies a collection scope comprising a set of one or more functions in the device for which to collect state data, and wherein the disruption vector specifies, for each of the one or more functions, a corresponding level of disruption that will be caused by the device dump;
- collect device dump data from the device in accordance with the collection scope data structure and the disruption vector; and
- generate the system dump data structure based on the collected device dump data.

12. The computer program product of claim 11, wherein the collection scope data structure and disruption vector are communicated by the device to the operating system prior to initiating the system dump operation, and wherein each function of the device has an associated collection scope data structure and disruption vector.

13. The computer program product of claim 11, wherein the computer readable program causes the computing device to collect device dump data from the device at least by:
- selecting a function from the set of one or more functions in the collection scope to be a device state data collection initiator for the collection scope based on a device state data collection initiator selection rule, wherein a device driver associated with the device state data collection initiator initiates collection of device state data from the device for other functions in the collection scope.

14. The computer program product of claim 11, wherein the data collection initiator selection rule is defined in terms of at least one characteristic of functions in the device, and wherein the data collection initiator selection rule is applicable to a plurality of collection scopes of one or more devices coupled to the data processing system.

15. The computer program product of claim 11, wherein the computer readable program causes the computing device to collect device dump data from the device at least by:
- applying one or more device state dump writer rules to the collection scope to determine whether a function in the set of one or more functions is to be assumed to be a device state dump writer function;
- determining, in response to a determination that a function in the set of one or more functions is to be assumed to be a device state dump writer function, whether the device state dump writer function will be disrupted by the device dump, based on the disruption vector; and
- configuring the collecting of the device dump data based on the determination of whether the device state dump writer will be disrupted by the device dump.

16. The computer program product of claim 11, wherein the computer readable program causes the computing device to configure the collecting of the device dump data at least by configuring the collecting of device dump data such that device dump data is collected for functions of the device in order of a level of disruption to the functions of the device, wherein the order prioritizes collection of device dump data from functions having a relatively less severe level of disruption prior to functions having a relatively more severe level of disruption.

17. The computer program product of claim 11, wherein the computer readable program causes the computing device to determine whether the device state dump writer function will be disrupted by the device dump further at least by:
- determining, based on the disruption vector, a disruption level for the device state dump writer function;
- determining, based on a disruption rule, whether the disruption level for the device state dump writer function exceeds a disruption tolerance for the device state dump writer; and
- terminating the device dump in response to the disruption level for the device state dump writer function exceeding the disruption tolerance.

18. The computer program product of claim 11, wherein the computer readable program further causes the computing device to:
- retrieve dump rules specifying at least one dump collector rule, at least one dump writer rule, and at least one disruption tolerance rule, wherein the at least one dump collector rule specifies criteria for selecting a dump collector function from the set of one or more functions of the collection scope, the at least one dump writer rule provides assumptions for assuming which functions in the set of one or more functions of the collection scope are to be assumed to be dump writer functions, and wherein the at least one disruption tolerance rule specifies a disruption level tolerance for functions in the set of one or more functions of the collection scope; and
- apply the dump rules to the collection scope and disruption vector to configure the device dump to maximize device dump data that is collected from the device, wherein the device dump date is collected in accordance with the configuring of the device dump.

19. The computer program product of claim 11, wherein the device is a multi-function multi-protocol network adapter, and wherein a first function of the multi-function multi-protocol network adapter supports a first network communication protocol and a second function of the multi-function multi-protocol network adapter supports a second network communication protocol.

20. A computing device comprising:
a processor; and
a memory coupled to the processor, wherein the memory comprises instructions which, when executed by the processor, cause the processor to:
initiate a system dump operation;
request, by a dump manager of the computing device, a device dump from a device coupled to the computing device;
retrieve a collection scope data structure and disruption vector corresponding to the device, wherein the collection scope data structure specifies a collection scope comprising a set of one or more functions in the device for which to collect state data, and wherein the disruption vector specifies, for each of the one or more functions, a corresponding level of disruption that will be caused by the device dump;
collect device dump data from the device in accordance with the collection scope data structure and the disruption vector; and generate the system dump data structure based on the collected device dump data.

* * * * *